United States Patent
Weber et al.

(10) Patent No.: US 7,249,438 B1
(45) Date of Patent: Jul. 31, 2007

(54) ELECTROMOTIVE ERADICATION OF MOSS

(76) Inventors: Arthur P. Weber, 1334 Surry La., Rockville Centre, NY (US) 11570; Thomas O. McAvoy, 898 Eisenhower Dr., West Hempstead, NY (US) 11552

(*) Notice: Subject to any disclaimer, the term of this patent is extended or adjusted under 35 U.S.C. 154(b) by 306 days.

(21) Appl. No.: 10/855,163

(22) Filed: May 27, 2004

Related U.S. Application Data

(60) Provisional application No. 60/475,655, filed on Jun. 4, 2003.

(51) Int. Cl.
*A01B 41/00* (2006.01)
*H01B 1/02* (2006.01)

(52) U.S. Cl. .................. 47/1.43; 47/58.1 R; 252/520.3

(58) Field of Classification Search ............. 47/1.01 R, 47/59 R, 1.43, 58.1 R, 58.1 SC, DIG. 9, 47/DIG. 10, DIG. 11; 252/520.3
See application file for complete search history.

(56) References Cited

U.S. PATENT DOCUMENTS

| | | | |
|---|---|---|---|
| 3,280,128 A | 10/1966 | Harrison et al. | |
| 3,337,405 A | 8/1967 | Netien et al. | |
| 3,846,114 A | 11/1974 | Perkow | |
| 3,964,893 A | 6/1976 | Everingham et al. | |
| 4,150,026 A | 4/1979 | Miller et al. | |
| 5,643,852 A | 7/1997 | Lucas et al. | |
| 6,258,752 B1 | 7/2001 | Sedun et al. | |
| 6,358,884 B1 | 3/2002 | Asano et al. | |

FOREIGN PATENT DOCUMENTS

| | | | |
|---|---|---|---|
| JP | 358017930 A | * | 2/1983 |
| SU | 605584 A | * | 4/1978 |

* cited by examiner

*Primary Examiner*—Christopher J. Novosad
(74) *Attorney, Agent, or Firm*—Collard & Roe, P.C.

(57) ABSTRACT

A method of controlling the growth of moss includes applying to the moss an aqueous solution including silver nitrate at a rate of about one fluid ounce per six square inches of moss.

3 Claims, 4 Drawing Sheets

FIG. 1 – BRYAM ARGENTIUM PHOTOMICROGRAPH PROFILES

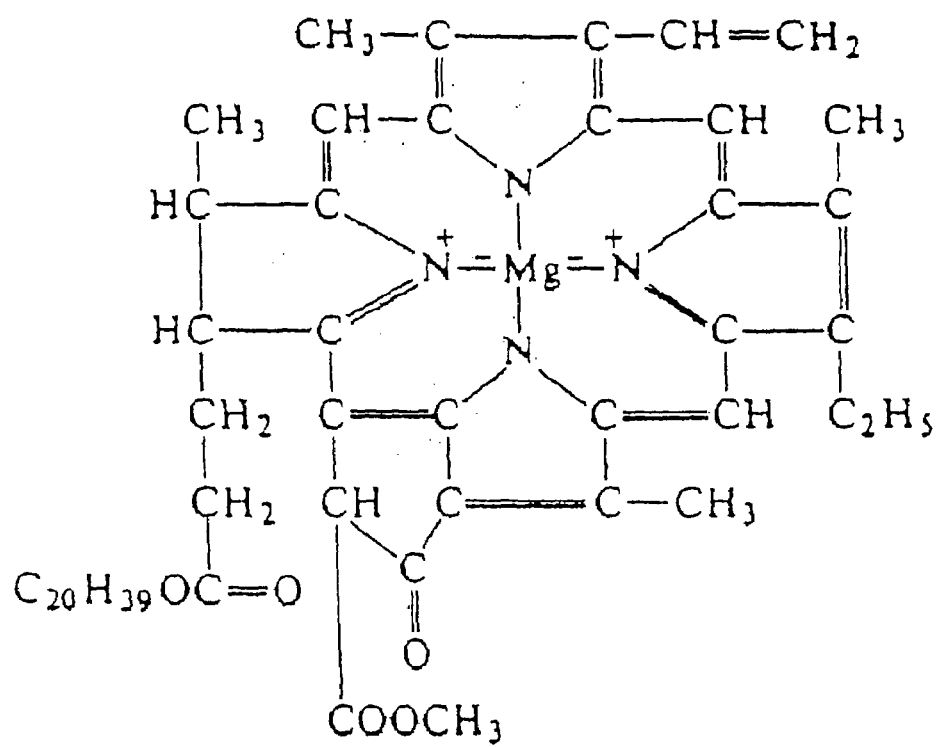
FIG. 2 - CHLOROPHYLL

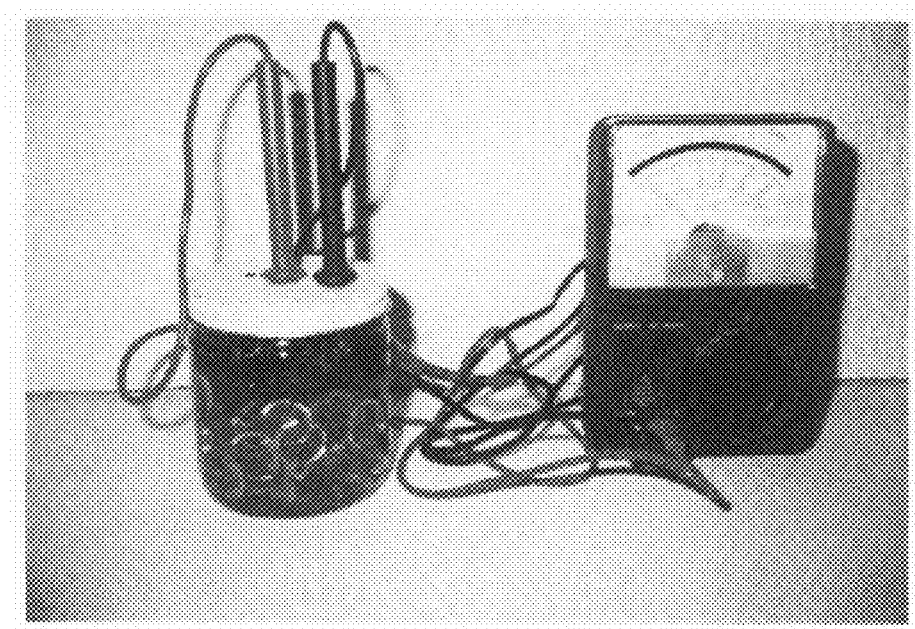
FIG. 3 - BRYUM ARGENTIUM/SILVER NITRATE BATTERY CELL

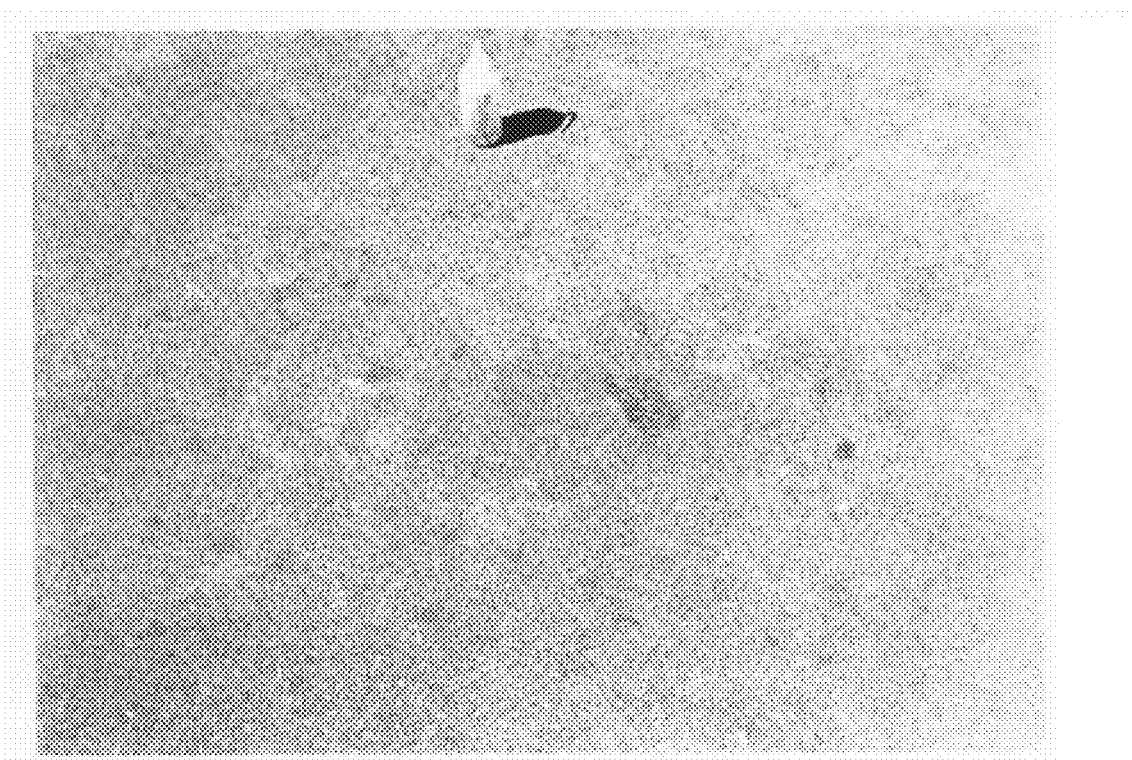
FIG. 4 - SPOT TREATED AND ERADICATED MOSS OUTCROPPINGS

ELECTROMOTIVE ERADICATION OF MOSS

CROSS-REFERENCE TO RELATED APPLICATIONS

This application claims priority under 35 U.S.C. § 119(e)(i) and the benefit of U.S. Provisional Application Ser. No. 60/475,655 entitled "Electromotive Eradication of Moss", filed Jun. 4, 2003, which is incorporated by reference herein.

BACKGROUND OF THE INVENTION

1. Field of the Invention

The present invention relates to the control of moss infestations and more particularly to a method of controlling the growth of moss, for example in golf putting greens.

2. The Prior Art

The proliferation of moss infestations in putting greens can be correlated to the asymptotic lowering of mower heights in the pursuit of "fast green speeds". The side effect, stressing and thinning the turf cover, promotes the invasion of undesirable species, e.g. moss, to impair the consistency of the green surface as a putting medium. See Happ, Keith A. (1998) "Moss Eradication in Putting Green Turf", USGA Green Section Record, September/October 1998.

Of the about 9,500 purported moss variations, *Bryum Argentium*, commonly Silvery Thread Moss, has been identified as the dominant invasive species. The botanical phylum, Briophata, includes mosses and liverworts, the simplest of land dwelling plants which, from fossil records dating back some 400 million years, prevail as enduring primitive species whose morphology, growth and survival characteristics differ radically from higher plants, e.g. the putting green turf grasses within which they coexist.

Mosses do not have roots and, in their absence, the plants anchor to a surface with rhyzoids attached to a substrate. Consequently, mosses can thrive on surfaces as dissimilar as rocks, concrete walks and masonry walls. Neither do mosses have a defined vascular system for water and nutrient delivery or, conversely, as a pathway to facilitate control or eradication.

Mosses survive long periods of drought, dehydrate and sustain prolonged dormancy, to then resume-photosynthesis upon rehydration. Receptors and patterns of water uptake have been advanced, the modus operandi of which remain obscure. Uniquely, water uptake by *Bryum Argentium* is comparatively rapid, categorizing the plant as being ectohydric. See Moore, C. S. and Scott, G. A. M. (1979) J. Bryol 10:291-311; Buch, H. (1945), "Uber die Wasser-und Mineralstoff-versongung der moose", Commentat, Biol Sci, Fenn 9(16), 1-44; Chopra, R. N. and Kumra, P. K. (1988), "Alternative Pathways in Life Cycle", Biology of Bryophysics, 5: 107-127 and 12: 308-311.

*Bryum Argentium* moss infestations prevail as spongelike biomasses which, when microscopically viewed in cross-section, provide a densely packed labyrinth of minuscule voids and interstices. Photomicrographs, depicted in FIG. 1, were taken at 10×, 30×, and 63× magnification to correspondingly decreasing 22 mm, 13 mm and 3.5 mm fields of view, using a Nikon SMZ Zoom Stereo Microscope with a 1× objective lens and a Nikon Coolpix 4500 4 megapixel digital camera.

Given that the surface-to-volume ratios of voids vary inversely with size and shape, *Bryum Argentium* infestations comparatively interface to their ambient environment with an extraordinary high biomass surface relative to volume. This key attribute, in the absence of root hairs to absorb water and leaf stomata to respire carbon dioxide and oxygen, serves to sustain photosynthesis by extended surface adsorption and absorption.

Although *Bryum Argentium* persists within a broad divergence of ambient parameters, remarkable exceptions have been metal contaminated soils. The toxicity sequence has been found to be Hg>Cu>Pb>Ni>Cd>Zn>Mg, the heavy metals being the most toxic. Mercury (Hg) based management controls, particularly, had been found to be highly effective but discarded for not being environmentally viable. Recently application programs using copper hydroxide based fungicides have been advanced for post-emergence moss control. See Richardson, D. H. S. (1981), "Structure and Classification", Biology of Mosses, Halsted Press U.S.A., 1:1-5; 10:155-161; Neibocor, E. and Richardson, D. H. S. (1980) "The Replacement of the Nondescript Term Heavy Metals by a Biologically and Chemically Significant Classification of Metal Ions", Environmental Pollution, (ser. B) 1:3-26; Coombs, A. J. and Lepp, N. W. (1974) "The Effect of Cu and Zn on the Growth of *Marchantia Polymorpha* and *Funaria Hygrometrica*", Bryologist 77:447-452; Hummel, Norman W. (1988) "An Integrated Approach to Moss Control in Golf Course Greens", Research Experiment, Cornell University; Simola, L. K. (1977) "Growth and Ultrastructure of *Sphagnum Fimbriatum* Cultured with Arsenate, Fluoride, Mercury and Copper Ions", J. Hattori Bot Lab: 147-155; Shaw, J. A. (1991) "Ecological Genetics, Evolutionary Constraints, and the Systematics of Bryophytes", Advances in Bryology, 4:29-74; Taylor, J & Danneberger, K. (1996) "Moss on Greens when the Rolling Stone Stops", Golf Course Management, 64:9 53-56; Golf Course Superintendents (1997) "Moss Control Survey", Northern Ohio Turfgrass Newsletter; Hummel, Norman W. (1994) "Methods for Moss Control", Golf Course Management Research Report, 65:3 106-110; Rossi, F. S. (2002) "Moss Control Research at Cornell University", Summary of 2002 Research; Dudones, D. W. (2002), "Silvery Thread Moss (*Bryum Argentium*) Population Reduction Strategies for Golf Course Putting Greens, M. S. Thesis—Cornell University.

However, there is still a need for a method of controlling and eradicating moss in putting greens which is simple and effective.

SUMMARY OF THE INVENTION

A method of controlling the growth of moss is provided which eliminates undesirable moss, in particular Silvery Thread Moss (*Bryum Argentium*) in putting greens. The method includes applying to the moss an aqueous solution including silver nitrate at a rate of about one fluid ounce per six square inches of moss. Preferably, the aqueous solution has a concentration between 0.1 and 0.4 weight percent, preferably at least 0.22 weight percent, of silver nitrate.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings,

FIG. 1 shows photomicrograph profiles of *Bryum Argentium*;

FIG. 2 shows the structure of a chlorophyll molecule;

FIG. 3 shows a *Bryum Argentium*/Silver Nitrate Battery Cell used to verify electromotive destruction of *Bryum Argentium*.

FIG. 4 shows the results of spot treating and eradicating moss outcroppings in accordance with the process of the invention.

DETAILED DESCRIPTION OF PREFERRED EMBODIMENTS

The present invention eradicates moss by killing the chlorophyll electromotively. The toxicity response to metals by *Bryum Argentium* parallels the Activity Series, i.e. an arrangement of the metals in the order of their tendency to react with water and acids so that each metal in the series displaces from solution those below it and is displaced by those above it. Because the displacement involves the transfer of electrons from the reducing agent to the oxidizing agent and may be used as a source of electric current, the Activity Series is also known as the Electromotive Series.

To obtain this result, the oxidation/reduction reaction must take place in an appropriate apparatus, e.g. a battery cell, so constructed that the transfer of electrons from one atom to the other, as a current between electrodes, takes place along an intervening conductor. However, sufficient energy, in the form of a relative potential difference between the electrodes, must be made available as an electromotive force to overcome any interposed resistance to the electron current flow from the reducing agent to the oxidizing agent.

In order to compare the electrode potentials between metals and their solutions, it is customary to use solutions in which the concentration of the metal ions is "Normal", i.e. molar. As a basis for comparison, inasmuch as absolute electrode potentials cannot be determined with reasonable accuracy, the potential of a platinum electrode saturated with hydrogen gas under one atmosphere pressure against a solution which is "Normal" with respect to the hydrogen ions is called zero. Table 1 comparatively tabulates the relative electrode potentials, expressed in volts, of various elements at 25° C. in contact with solutions that are "Normal" with respect to their ions, thereby electromotively quantifying the Activity Series.

TABLE 1

ACTIVITY SERIES a/k/a ELECTROMOTIVE SERIES POTENTIALS OF ELEMENTS IN CONTACT WITH NORMAL CONCENTRATION OF THE ION AT 25° C.

| Element | Ion | Potential in Volts | Element | Ion | Potential in Volts |
|---|---|---|---|---|---|
| K | $K^+$ | −2.92 | $H_2$ | $H^+$ | 0.00 |
| Na | $Na^+$ | −2.71 | Sb | $Sb^{+++}$ | +0.10 |
| Ca | $Ca^{++}$ | −2.5(?) | As | $As^{+++}$ | +0.3(?) |
| Mg | $Mg^{++}$ | −1.55 | Cu | $Cu^{++}$ | +0.34 |
| Al | $Al^{+++}$ | −1.34 | Cu | $Cu^+$ | +0.47 |
| Zn | $Zn^{++}$ | −0.75 | Hg | $Hg^+$ | +0.79 |
| Fe | $Fe^{++}$ | −0.44 | Ag | $Ag^+$ | +0.80 |
| Cd | $Cd^{++}$ | −0.40 | Hg | $Hg^{++}$ | +0.86 |
| Co | $Co^{++}$ | −0.24 | Au | $Au^+$ | +1.5(?) |
| Ni | $Ni^{++}$ | −0.22 | $O_2$ | $OH^-$ | +0.11 |
| Sn | $Sn^{++}$ | −0.14 | $I_2$ | $I^-$ | +0.62 |
| Pb | $Pb^{++}$ | −0.12 | $Br_2$ | $Br^-$ | +1.08 |
| Fe | $Fe^{+++}$ | −0.04 | $Cl_2$ | $Cl^-$ | +1.35 |
|  |  |  | $F_2$ | $F^-$ | +1.9(?) |

From Table 1, the limiting potential difference across a battery cell, measured in volts, can be calculated. For example, metallic magnesium, in contact with a "Normal" $Mg^{++}$ ion solution, acquires a negative potential of −1.55 volts, while mercury in contact with a "Normal" $Hg^+$ ion solution acquires a positive potential of +0.79 volts. The limiting voltage, therefore, across the electrodes of such a magnesium/mercury battery cell would be the algebraic difference between the relative electrode potentials +0.79−(−1.55)=2.34 volts.

The green pigment essential to photosynthesis, Chlorophyll, is a porphorin structured molecule containing a hydrophilic carbocyclic ring with a lipophilic phytyl tail, nitrogen bridged from a negatively charged magnesium ion at the core of the molecule. (See FIG. 2) It is a photoreceptor up to 700 nm and transfers such radiant energy to its chemical environment, thus acting as a transducer in photosynthesis. See, e.g., Condensed Chemical Dictionary $12^{th}$ Ed., Richard J. Lewis, Sr., Van Nostrand Reinhold, N.Y.

It has now been found that heavy metals elicit a toxic response from *Bryum Argentium* because of the electromotive destruction of the chlorophyll. The electrical resistance between the negatively charged magnesium ion at the core of a chlorophyll molecule and, say, a surface interfaced positively charged mercury ion is such that the relative potential difference between the ions is large enough to permit the $Mg^-$ ion to be oxidized by losing and transporting its electrons to reduce the $Hg^+$ ion to metallic mercury.

The decreasing relative electrode potential difference between the metals of higher ranking than mercury in the Activity Series are apparently insufficient as driving forces to overcome the molecular binding energy of the $Mg^-$ electron in chlorophyll and resistance to the conduction of the electron in *Bryum Argentium*, wherein chlorophyl functions as the negative electrode of a galvanic cell. Significantly, copper was empirically found to be the nearest toxicity competitor to mercury and, as it turns out, ranks just above mercury in the Activity Series, with a relative $Cu^{++}$ cupric ion electrode potential of +0.34 volts, or relatively 0.79−0.34=0.45 volts less than a mercuric ion. However, copper falls short of the mark.

Theoretically, the Activity Series forecasts that silver, developing at least the same relative electrode potential as mercury, would galvanically destroy the chlorophyll in *Bryum Argentium* as effectively as mercury.

To demonstrate the effectiveness of the process of the invention and to support the hypothesis as to the toxic response elicited from *Bryum Argentium*, moss infection at the Old Westbury Golf and Country Club, Old Westbury, N.Y. were totally and permanently eradicated by spot drenching with low application rates of highly diluted aqueous solutions of silver nitrate. Surrounding grassplants remained vigorous inasmuch as the topical application and penetration of the required silver dosage attenuated short of the grass plant root zones. By-product nitrate in solution remained as a turf repair nutrient.

To experimentally verify that the chlorophyll had been electromotively destroyed, a battery cell shown in FIG. 3 was assembled.

Harvested *Bryum Argentium* moss outcroppings (the cathode) were steeped in water, containing a trace of salinity as a conductive electrolyte, and diaphragm separated from aqueous silver nitrate solution (the anode). The induced electron current flow was indicated by a voltage difference across the immersed cathode and anode terminals of a calibrated multi-meter. Chlorophyll destruction caused the moss to blacken around the cathode terminal and metallic silver to deposit on the anode terminal.

The battery was assembled within a 6 fl. oz transparent glass screw-top jar, 2⅜ inches diameter by 2¾ inches high.

The diaphragm, a hollow cardboard cylinder, centrally positioned and epoxy affixed within the jar, was 3/4 inches outside diameter by 1/16 inch thick, and stood 2 3/4 inches high. To displace excess volume the annulus around the cylindrical diaphragm was half-filled with glass beads, on top of which 10 grams of harvested *Bryum Argentium* was steeped in 100 ml of a 0.01% saline aqueous solution. The core of the cylindrical diaphragm was filled with 23 ml of 0.22% silver nitrate solution (0.14% silver). The multi-meter indicated a direct current voltage that peaked and dwelled at 0.6 volts for some 90 minutes, before gradually diminishing as the chlorophyll was destroyed and the battery cell exhausted.

The putting green in the study, constructed in 1962, were "push-up" type, sand amended, approximately 70% creeping bentgrass (Pencross)/30% annual bluegrass (*Poa Annua*), double cut daily at 1/8 inch mower bed knife height to not less than 9 1/2 Stimpmeter speed, fed 1 1/2 lbs of nitrogen/1000 sq. ft./year, preventively fungicide treated, verticut and top dressed bi-monthly in season. The trials remained ongoing throughout the 2002 calendar year.

Only one application, with a minimum aqueous solution concentration of 0.22 weight percent silver nitrate (0.14 weight percent silver), prepared by dissolving one gram of silver nitrate in 16 fluid ounces of water, and spot treated by drenching at the rate of one fluid ounce per six square inches of moss outcroppings, in every instance and under all environmental and ecological conditions successfully eradicated moss infestations, without semblance of reemergence. Treated and eradicated moss outcroppings appear as darkened areas in FIG. 4.

Thus, in accordance with the invention undesirable Silvery Thread Moss (*Bryum Argentium*) populations in putting greens, which have been exacerbated by the lowering of mower bed knife heights to comply with the golfers' preference for "fast greens", have been controlled simply and effectively.

While only a few embodiments of the present invention have been shown and described, it is to be understood that many changes and modifications may be made thereunto without departing from the spirit and scope of the invention as defined in the appended claims.

What is claimed is:

1. A method of controlling the growth of moss which comprises applying to said moss an aqueous solution comprising silver nitrate at a rate of about one fluid ounce per six square inches of moss;

wherein said aqueous solution has at least 0.22 weight percent silver nitrate.

2. The method according to claim 1 wherein said aqueous solution has a concentration between 0.22 and 0.4 weight percent silver nitrate.

3. The method according to claim 1 wherein the moss comprises Silvery Thread Moss (*Bryum Argentium*).

* * * * *